March 21, 1939.   D. H. CROSSER   2,151,192
FLOWER AND CANDLE HOLDER
Filed Dec. 28, 1936
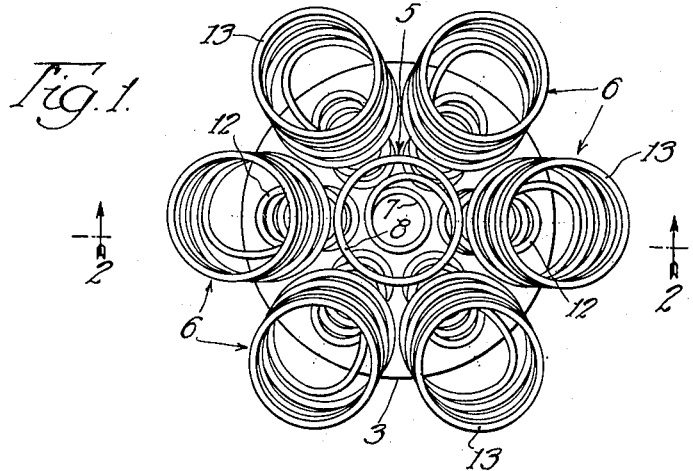
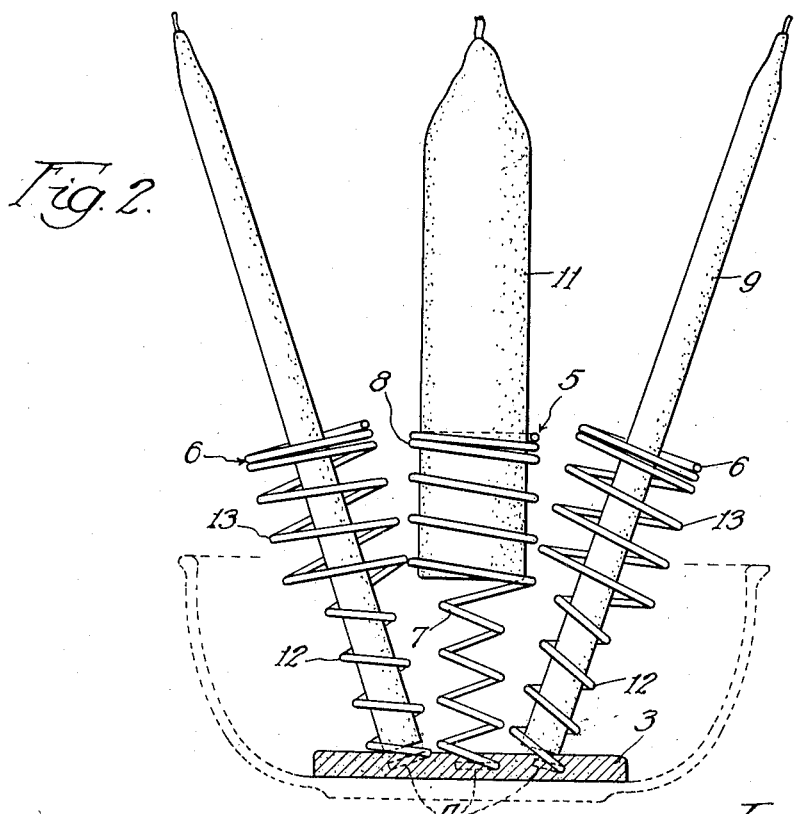
Witness:
V. Siljander
Inventor
David H. Crosser
By Hill & Hill
Attys.

Patented Mar. 21, 1939

2,151,192

UNITED STATES PATENT OFFICE 2,151,192

FLOWER AND CANDLE HOLDER

David H. Crosser, Chicago, Ill., assignor to National Tinsel Mfg. Co., Manitowoc, Wis., a corporation of Wisconsin Application December 28, 1936, Serial No. 117,918

3 Claims. (Cl. 240—2)

This invention relates to holders or supporting devices, and particularly to a device of the character described for supporting flowers, candles and the like, frequently used for decorative purposes, as, for example, in table decorations, such as center pieces or the like.

One object of the present invention is to provide a novel construction and arrangement whereby flowers, for example, either natural or artificial, may be arranged in various positions to form an attractive bouquet.

Another object of the invention is to provide means for securing the flowers in desired position, and in a manner which will permit of handling the device without special care and still retain the flowers as arranged in the device.

Another object of the invention is to provide novel candle supporting means in combination with the flower supporting structure.

Another object of the invention is to provide novel means for supporting candles of various diameters in combination with the flower supporting means and weighted base therefor.

A further object of the invention is to provide a flower and candle holder, which is practical, efficient in its operation and economical to manufacture.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a plan view of my improved flower and candle holder embodying features of the present invention; and Fig. 2 is a sectional elevational view taken substantially as indicated by the line 2—2 of Fig. 1, and showing in dotted lines a receptacle in relation to the flower and candle supporting structure.

It may be mentioned that heretofore in devices of the character described, considerable difficulty has been experienced in retaining flowers and candles in desired position when arranged in a decorating bouquet owing to the inefficiency of the supporting structures related to the stems of flowers and to the candles. One of the principal objects, therefore, of the present invention is to provide adequate support at various points along the stem of the flowers by which a flower may be supported and retained in desired position.

As shown in the illustrative embodiment, the present invention comprises a base 3 formed, preferably, of heavy material such, for example, as lead, which provides suitable weight for retaining the device in upright position, and is not susceptible to the action of water which may be used when natural flowers are employed in making up a bouquet.

Mounted on the base 3 and having their lower end portions, preferably, embedded in the material thereof, as indicated at 4, are a plurality of flower and candle supporting members indicated, as a whole, and respectively, by the numerals 5 and 6, the member 5 being shown, in the present instance, as positioned, preferably, adjacent the central portion of the base and extending upwardly therefrom and, preferably, perpendicular thereto, the supporting member 5 being of spiral or spring-like formation and formed, preferably, of resilient material such, for example, as spring metal or the like.

As illustrated in the drawing, the member 5 is provided adjacent its lower end with a portion 7 of substantially less diameter than the upper portion 8, the portion 7 being adapted to receive candles of relatively small diameter as indicated at 9, while the portion 8 of relatively greater diameter is adapted to receive candles of larger diameter as indicated at 11.

The supporting members 6 are substantially like the member 5 and are provided with portions 12 of reduced diameter adjacent the lower ends, and with portions 13 of greater diameter adjacent their upper ends, the members 6 being shown, in the present instance, as radially spaced with respect to the supporting member 5 and extending upwardly and outwardly at an inclined angle with respect to the base 3 in a manner to produce a flaring effect of the candles, which, if small, may be positioned in the portions 12 of reduced diameter, as shown in the drawing, or, if of larger diameter, may be positioned in the enlarged portions 13 of the members.

It will be observed from the foregoing description that by reason of the open character of the spiral formation of the members 5 and 6, that the stems of flowers may be projected therethrough and interlaced with portions of adjacent members in a manner to provide two or more points of contact or engagement of the members with the stems, thereby providing a most efficient means for supporting the flowers in desired position and as arranged, and that by reason of the resilient character of the material from which the members 5 and 6 are formed, the stems may be forced between the various convolutions of the spiral in a manner to produce a binding effect to further and adequately secure the stems and flowers in desired position.

It will be observed also that owing to many angles at which the stems of flowers may be placed in the device, a bouquet of more or less closely bunched flowers may be arranged for positioning in a relatively tall receptacle, or, if desired, a bouquet of broader flaring proportions may be arranged for broader and more shallow receptacles, and that in both instances the stems may be effectively secured and retained in desired position against accidental displacement.

It will be observed also that by reason of portions of the members 5 and 6 being formed of different diameters adjacent their ends to provide sockets, that candles of correspondingly different diameters may be conveniently and readily employed in combination with the flowers for decorative purposes.

Obviously, the present invention is not limited to the precise construction and arrangement shown and described as the same may be variously modified without departing from the spirit and scope of the invention as set forth in the appended claims.

What I claim as new and desire to secure by Letters Patent is:

1. A device of the class described comprising a base, and a plurality of elongated spirally formed flower and candle supporting members of resilient material having their lower end portions embedded in said base and extending divergently upwardly and outwardly therefrom, each of said members having substantially parallel sides and provided with portions of different transverse diameters intermediate its ends with the portions of lesser diameter being adjacent said base.

2. A device of the class described comprising a base, and a plurality of elongated spirally formed flower and candle supporting members of resilient material mounted thereon and extending divergently upwardly and outwardly therefrom, each of said members having substantially parallel sides and provided with portions of different transverse diameters adjacent their respective ends, the portion of lesser diameter being adjacent said base.

3. A device of the class described comprising a base, an elongated spirally formed flower and candle supporting member extending upwardly from adjacent the central portion thereof, and a plurality of elongated spirally formed flower and candle supporting members radially spaced from said first mentioned member and extending divergently upwardly and outwardly from said base, each of said members having substantially parallel sides and provided with portions of different transverse diameters adjacent the respective ends of the members and providing sockets for the reception of candles of different diameters in the respective sockets, the portions of lesser diameter of the respective members being adjacent the lower ends thereof.

DAVID H. CROSSER.